C. J. ANDERSON.
LAND PACKER.
APPLICATION FILED DEC. 15, 1913.

1,135,091.

Patented Apr. 13, 1915.

WITNESSES:
G. E. Carlsen
D. E. Carlsen

INVENTOR.
Carl J. Anderson.
BY his ATTORNEY:
A. M. Carlsen.

UNITED STATES PATENT OFFICE.

CARL J. ANDERSON, OF SANBORN, NORTH DAKOTA.

LAND-PACKER.

1,135,091.

Specification of Letters Patent.

Patented Apr. 13, 1915.

Application filed December 15, 1913. Serial No. 806,713.

*To all whom it may concern:*

Be it known that I, CARL J. ANDERSON, a citizen of the United States, residing at Sanborn, in the county of Barnes and State of North Dakota, have invented a new and useful Land-Packer, of which the following is a specification.

My invention relates to improvements in land packers adapted to be drawn over a plowed field for purpose of packing down the furrows into the grooves and openings which the plow leaves partly between and partly underneath the turned furrows.

The device may be drawn by horses or other power applied directly or indirectly to it; but I prefer to attach the device to a plow, so that when the plowing is done the packing of the furrows is also done. The device may be of any size according to the number of plows used in or attached to a single frame; but for purpose of illustration and explanation I have in the accompanying drawing shown the packer attached to a frame in which two plows are mounted and the frame supported by wheels.

Figure 1:
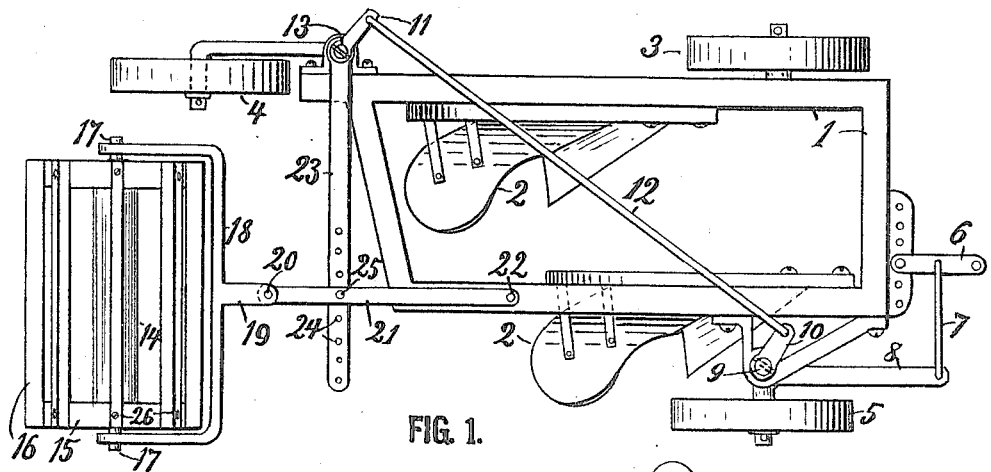
Figure 2:
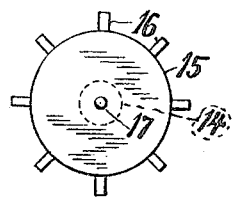
Figure 3:
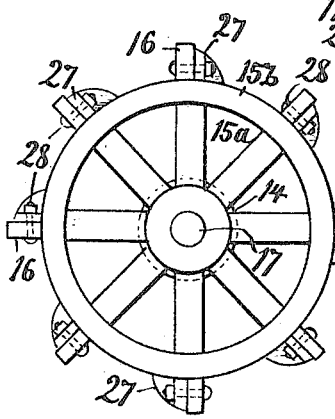
Figures 4, 5:
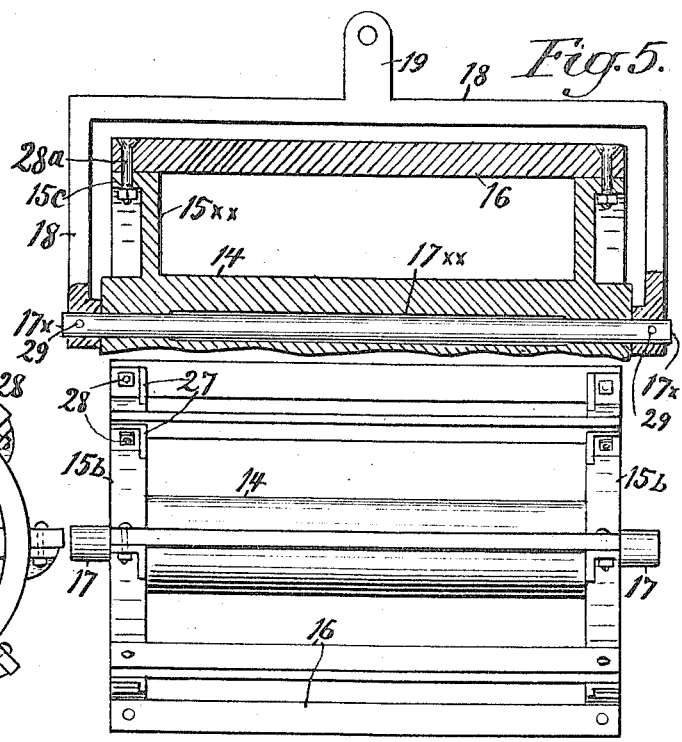

In said drawing, Figure 1 is a top view of a duplex plow with my land packing device attached to it. Fig. 2 is an end elevation of the roller of the land packer shown in Fig. 1. Fig. 3 is an enlarged modification of Fig. 2. Fig. 4 is a side view of the roller in Fig. 3. Fig. 5 is a partly sectional top view of the front half of the roller and the bail by which it is attached to the plow frame, showing further modifications.

Referring to the drawing by reference numerals, 1 designates a frame in which two plows, 2, 2, are mounted; the frame is mounted on wheels 3, 4 and 5, of which the two latter are usually inclined so as to counteract the tendency of the moldboards to force the plows over to the left side; such inclined position being well known I have not illustrated it; and it is almost as unnecessary to mention that the plow frame is drawn by a draft bar 6, which is connected by a link 7 with an arm 8, by which the fork stem 9 of the wheel 5 is turned in guiding the wheel 5, and said stem 9 is connected by rocker arms 10, 11 and a rod 12, with the fork stem 13 of the wheel 4, so that the wheels 4 and 5 are steered in unison according as the direction of the draft appliance 6 is changed.

The land packer comprises a skeleton roller made up of a central bar 14, which may be hollow, end-pieces 15, the bars 16, and journals 17 which are held in the arms of a fork or bail 18, having a reach 19, which is pivoted at 20 to the rear end of a draft bar 21, whose front end is pivoted at 22 to the plow frame. Said draft bar may be held more or less toward either side of the plow by a brace 23, which is pivotally placed on the stem 13 and is provided with several holes 24, into either of which a pin 25 may be placed and passed through a hole in the draft-bar.

In all the views the bars 16 are supposed to be, in a full sized machine, made of metal and about one-half inch thick by three and one-half inches wide in radial direction of the roller. The latter dimension will of course be increased if the roller is very long, as may be required when the device is to be used in connection with large gang-plows having from half a dozen to a dozen or more plows in one frame; but the thickness of one-half inch I have found to work very satisfactorily. As for modifications, I have shown in Figs. 1 and 2 that the end pieces 15 may be solid disks and the bars 16 secured thereto by screws as shown at 26 in Fig. 1; while in Figs. 3 and 4 15$^a$ are spiders having rings 15$^b$ with integral brackets or lugs 27, to which the bars are secured by bolts 28. In Fig. 5 the spiders are each formed with an annular flange 15$^c$, through which the bar-holding bolts 28$^a$ are passed in radial direction of the spider. In said view it is also shown that the journals 17$^x$ are the ends of a shaft 17$^{xx}$, journaled in the part 14 and fixed by pins 29 in the arms of the bail 18. The hollow center bar 14 and the spiders may be cast in one piece or in several and put together; and if the spiders are made heavy enough to make the device of the required weight the center bar 14 may be made so much lighter, or even dispensed with.

The special advantages of this device are, that the open space between the center bar and the bars 16, 16, prevents clogging of the packer, the narrow faces of the bars 16 cut and crush and pack the land with good effect, the device may be disposed or adjusted toward either side of the plow, so as to make it work in proper position upon the furrows plowed, and the attaching of the device rearward of the plow frame enables the plow frame to be turned toward either side without getting into contact with the packing device.

What I claim is:

The combination with a frame having supporting wheels, the rearmost one of which is of the caster type having a vertical journaled stem, of plows secured to and drawn by the frame, a land-packing roller having a frame arranged to move in rear of the plows and to roll upon the furrows as fast as they are plowed; a draft bar pivoted with its rear end to the roller frame and its front end to the plow frame and having an aperture intermediate said pivots, a transversely arranged brace bar having one end pivoted on the journaled stem of the caster-wheel and its body perforated and crossing the draft-bar, and a pin adapted to be inserted in the aperture in the draft-bar and into either one of the apertures or perforations in the brace bar.

In testimony whereof I affix my signature, in presence of two witnesses.

CARL J. ANDERSON.

Witnesses:
 LOUIS MALM,
 HAROLD J. MALM.

Copies of this patent may be obtained for five cents each, by addressing the "Commissioner of Patents, Washington, D. C."